G. E. GRIER.
FRUIT WASHING AND BLANCHING MACHINE.
APPLICATION FILED NOV. 23, 1914.
1,168,799.
Patented Jan. 18, 1916.
2 SHEETS—SHEET 1.
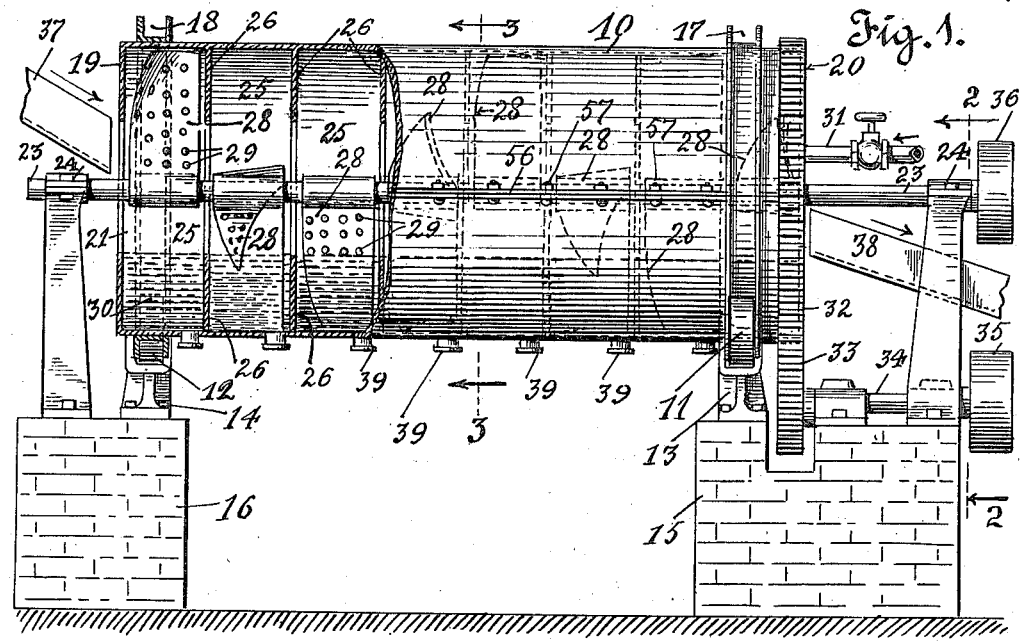
Witnesses,
Inventor,
by George E. Grier,
Attys.

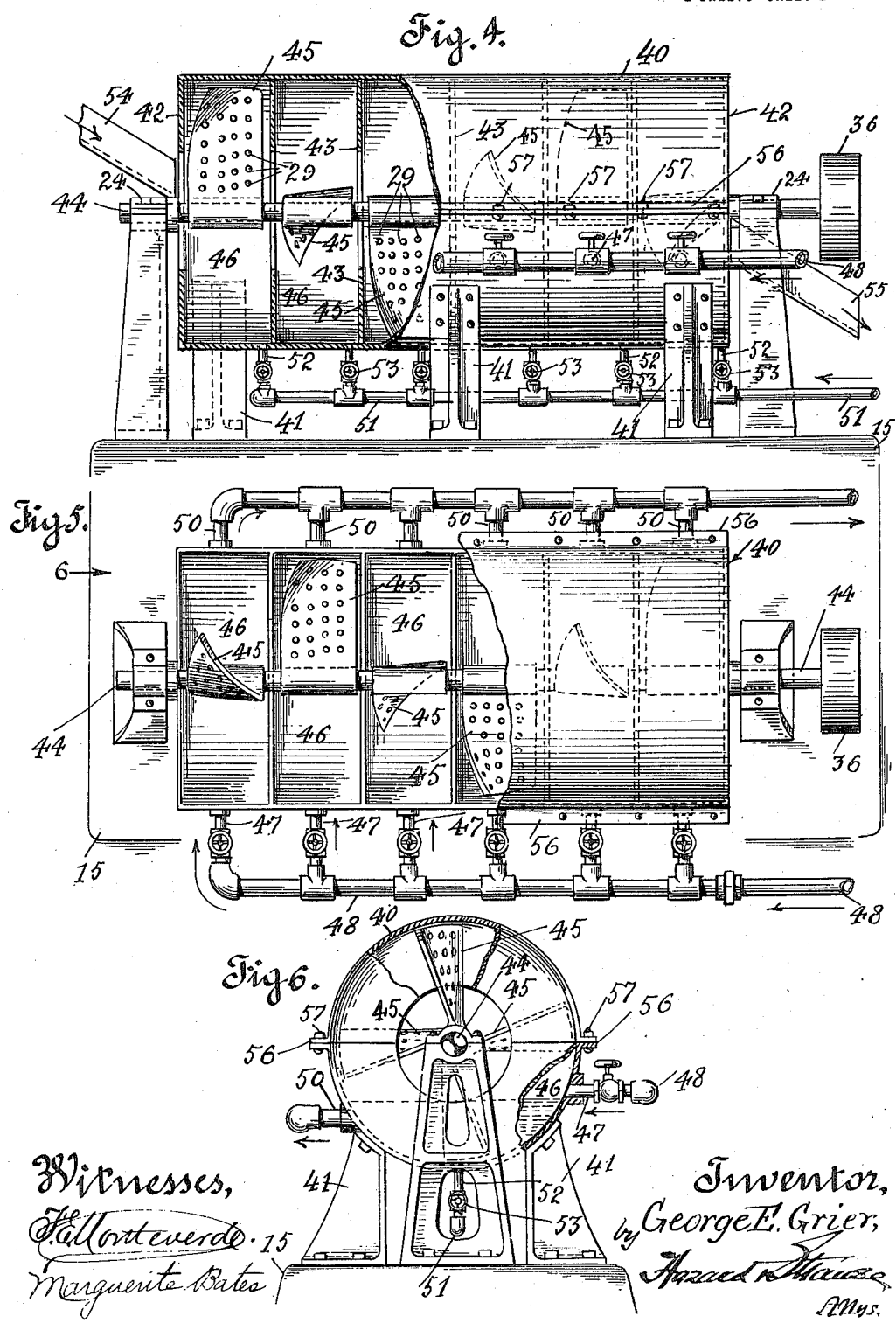

UNITED STATES PATENT OFFICE.

GEORGE E. GRIER, OF SOUTH PASADENA, CALIFORNIA.

FRUIT WASHING AND BLANCHING MACHINE.

1,168,799.　　　　Specification of Letters Patent.　　Patented Jan. 18, 1916.

Application filed November 23, 1914. Serial No. 873,496.

*To all whom it may concern:*

Be it known that I, GEORGE E. GRIER, a citizen of the United States, residing at South Pasadena, in the county of Los Angeles, State of California, have invented new and useful Improvements in Fruit Washing and Blanching Machines, of which the following is a specification.

This invention relates to a fruit washing and blanching machine.

It is the object of this invention to provide a mechanism for washing and blanching fruit in which the fruit is conveyed continuously through a series of compartments and subjected to a washing or blanching action.

Another object is to provide a simple and effective means for advancing the fruit successively from one compartment to another, and whereby the fruit is moved through a body of liquid in each compartment and thoroughly agitated therein so as to insure a rapid and complete washing or blanching action.

A further object is to provide a machine of the above character which is continuous in its operation and of large capacity, so that a considerable quantity of fruit may be washed or blanched in a short time at small expense and without the use of manual labor.

The invention is illustrated in the accompanying drawings, in which:

Figure 1 is a view in side elevation of the machine, with parts broken away to show the interior construction thereof. Fig. 2 is a view in vertical section and end elevation, as seen on the line 2—2 of Fig. 1 in the direction indicated by the arrows. Fig. 3 is a view in vertical section and elevation, as seen on the line 3—3 of Fig. 1 in the direction indicated by the arrows. Fig. 4 is a view in side elevation, with parts broken away, of a modified form of the invention, illustrating same as adapted for use in blanching fruit. Fig. 5 is a plan view of the device shown in Fig. 4, with parts broken away. Fig. 6 is a view in end elevation, as seen in the direction indicated by the arrow in Fig. 5, with parts broken away.

More specifically, particular reference being had to Figs. 1, 2 and 3, 10 indicates a cylinder which is mounted to rotate on supporting rollers 11 and 12, arranged on opposite sides of the cylinder adjacent its ends; the rollers 11 and 12 being revolubly mounted on suitable standards 13 and 14, mounted on foundations 15 and 16 or other suitable means of support. The rollers 11 and 12 extend into annular channels 17 and 18 encompassing the outer periphery of the cylinder 10; the sides of the channels 17 and 18 engaging the sides of the rollers 11 and 12 to hold the cylinder 10 against longitudinal movement.

The ends of the cylinder 10 are formed with inner and outer end walls 19 and 20, which are formed with circular inlet and outlet openings 21 and 22. The openings 21 and 22 are formed centrally of the ends 19 and 20 and extend horizontally through the drum 10. On the axis thereof is a shaft 23, the outer ends of which project beyond the ends of the drum 10 and are revolubly mounted in suitable bearings 24.

The interior of the drum 10 is divided into a series of successive compartments 25 of any suitable number, by means of transverse partitions 26. The partitions 26 are formed with circular openings 27 corresponding to the inlet and outlet openings 21 and 22, through which openings the fruit to be washed or blanched is passed successively from one compartment to another.

Mounted on the shaft 23 and arranged in each compartment 25, is a blade 28 of a width approximate with that of the compartment 25, and of such length that its outer edge will just clear the inner periphery of the drum 10. The blades 28 are arranged in such relation to each other on the shaft 23 that the successive blades in the compartments 25 will be disposed at an angle of 90 degrees in relation to the adjacent blade, as particularly shown in Fig. 3.

The blades 28 are formed with perforations 29 and are turned on their rear edges to form dished or inclined faces which will operate when the blade 28 is advanced circumferentially through a compartment 25 to engage the fruit as the blade advances over the lower portion of the compartment and operate to eject the fruit into the adjacent compartment as the blade moves to an elevated position.

The compartments 25 are designed to receive a body of liquid 30, such as water, or chemical solutions, which may be delivered to the cylinder 10 through a supply pipe 31 extending into the discharge end thereof. If desired, the drum 10 may be partially submerged in a vat or any other suitable means may be employed whereby the lower portions of the chambers 25 will be filled with liquid to a depth corresponding to the width of the portion of the partition 26 extending between the opening 27 and the walls of the cylinder 10.

The cylinder 10 is fitted with gear teeth 32 at one end thereof, which are engaged by a driving pinion 33, on a drive shaft 34, adapted to be rotated by any suitable source of power, through a belt wheel 35 on the shaft 34. The shaft 23, carrying the blades 28, is fitted with a belt wheel 36, by means of which the shaft 23 may be rotated continuously by any suitable source of power. The shaft 23 is designed to be rotated in the direction indicated by the arrow $a$ in Fig. 3, and the cylinder 10 is designed to be rotated in the reverse direction, as indicated by the arrow $b$ in Fig. 3.

The fruit to be washed is delivered to the cylinder 10, through the inlet opening 21, by means of a chute 37, and after passing through the cylinder 10, as will be later described, will be delivered through the discharge opening 22, into a trough or chute 38.

In the operation of the form of the invention just described, the fruit to be washed is delivered to the end chamber 25, from the chute 37, whereupon the drum 10 is rotated in one direction and the shaft 23, carrying the blades 28, is rotated in the opposite direction. The fruit falling into the first compartment 25 is submerged in the liquid in the latter and is then picked up by the blade 28, which advances it through the liquid in opposition to a current set up in the latter by the rotation of the drum 10. As the blade 28 advances, a portion of the liquid 30 passes through the perforations 29 in the blade, thereby permitting a rush of the liquid around the fruit so as to insure a thorough action of the liquid thereon. As the fruit is advanced by the blade 28 it is lifted clear of the liquid in the first compartment and is caused to roll down the inclination of the blade 28 and to be discharged into the liquid in the adjacent compartment in front of a succeeding blade 28, which will then operate to advance the fruit through the liquid of the second compartment, discharging it into the third compartment, and so on; the blade in the outer end compartment operating to discharge the fruit into the trough 38, from which it is conveyed to any point of discharge.

If the liquid is delivered to the cylinder 10 through the supply pipe 31, the cylinder 10 is preferably disposed at a slight inclination to cause an overflow through the inlet opening 21 and the compartments 25, which are fitted with normally closed drain openings 39, through which the liquid may be drawn off from the various compartments.

In the form of the invention illustrated in Figs. 4, 5 and 6, a cylinder 40 is rigidly mounted on standards 41 and is fitted with centrally apertured end walls 42 and partitions 43, a propeller shaft 44, carrying curved, perforated blades 45 corresponding to the blades 28, is positioned in the cylinder 40, with the blades 45 extending in a series of compartments or chambers formed by the partitions 43. In this form of the invention the liquid for treating the fruit is delivered to each of the chambers 46 through separate lead pipes 47, connecting with a supply pipe 48; regulating valves being provided with lead pipes 47, by which the liquid passing to each of the compartments 46 may be regulated. Each compartment 46 is provided with an overflow pipe 50, through which the liquid delivered to the chamber 40 is carried away. As a means for heating the liquid in each of the compartments 46, a steam pipe 51 is provided with which branch pipes leading to the compartments 46 are connected; regulating valves 53 being provided in the branch pipes 52 by means of which the supply of steam to the liquid in the chambers 46 may be controlled. The lead pipes 52 open to the interiors of the compartments 46 through the bottom of the cylinder 40. In the operation of this form of the invention the fruit is delivered to the end compartment 46 by means of a feed-chute 54 and is conveyed successively through the compartments 46 by means of the blades 45 and subjected to the action of the liquid in the compartments 46, according to the character of the fruit being handled and the results desired; the fruit being finally discharged from the opposite end of the cylinder 40 into a chute 55.

As a means for gaining ready access to the interior of the cylinders 10 and 40, they are divided into halves on their horizontal centers; the partitions 26 and 43 being likewise divided and rigidly secured to corresponding cylinder sections. The two halves of the cylinder sections are fitted with abutting flanges 56, which are connected together by means of bolts 57.

It is manifest that any kind of fruit may be introduced into the machine and subjected to the action thereof and to the liquid therein, according to the results it is desired to obtain; the apparatus shown in Figs. 1, 2 and 3, however, being especially adapted for use in removing the skin from peaches previously subjected to the action of a solution of caustic soda, while the machine shown in Figs. 4, 5 and 6 is particularly adapted for blanching purposes.

An important feature of this invention resides in the form of the blades, by means of which the fruit may be picked up and transferred from one compartment to another without crushing or damaging the fruit, and a further important feature resides in the use of a plurality of successive chambers with a single propelling blade in each chamber, whereby the fruit will be caused to advance through a machine of any desired length in a step-by-step fashion without danger of clogging or accumulating any excessive quantities at any point throughout the length of the machine.

What I claim is:

1. A fruit treating machine comprising a cylinder having a series of compartments therein arranged in open communication with each other centrally of the cylinder and adapted to contain a body of liquid, a revoluble shaft extending through the cylinder, a series of projected screw blades of relatively great pitch offset and angularly disposed to each other mounted on said shaft, and means for rotating said shaft whereby fruit delivered at one end of the cylinder will be engaged by a blade and advanced successively from one compartment to another throughout the length of the cylinder.

2. In a fruit treating machine, a cylinder, a series of partitions in said cylinder formed with central openings, said partitions dividing the cylinder into a series of communicating compartments adapted to contain a body of liquid, a revoluble shaft extending axially of the cylinder, a series of perforated projected screw blades of relatively great pitch offset and angularly disposed to each other mounted on said shaft, one blade in each compartment, adapted on rotation of the shaft to pick up the fruit deposited in one compartment and eject it into the adjacent compartment through the opening in the partition, and whereby the fruit may be advanced step-by-step throughout the length of the cylinder and finally discharged therefrom.

3. A fruit treating machine, comprising a rotatable cylinder having a series of compartments therein arranged in open communication with each other centrally of the cylinder and adapted to contain a body of liquid, a revoluble shaft extending through the cylinder, a series of projected screw blades of relatively great pitch offset and angularly disposed to each other mounted on said shaft, and means for rotating said shaft whereby fruit delivered at one end of the cylinder will be engaged by a blade and advanced successively from one compartment to another throughout the length of the cylinder.

4. In a fruit treating machine, a rotatable cylinder, a series of partitions in said cylinder formed with central openings, said partitions dividing the cylinder into a series of communicating compartments adapted to contain a body of liquid, a revoluble shaft extending axially of the cylinder, a series of perforated projected screw blades of relatively great pitch offset and angularly disposed to each other mounted on said shaft, one blade in each compartment, adapted on rotation of the shaft to pick up the fruit deposited in one compartment and eject it into the adjacent compartment through the opening in the partition, and whereby the fruit may be advanced step-by-step throughout the length of the cylinder and finally discharged therefrom.

In witness that I claim the foregoing I have hereunto subscribed my name this 9th day of November, 1914.

GEORGE E. GRIER.

Witnesses:
HENRIETTA E. WORKMAN,
MARGUERITE BATES.